United States Patent [19]

Webb

[11] 4,299,361
[45] Nov. 10, 1981

[54] PROTECTIVE DEVICE FOR INSTRUMENTS AND LOCKING OF AIRCRAFT CONTROLS

[75] Inventor: J. Talmadge Webb, Satellite Beach, Fla.

[73] Assignee: August Betts Yates, Orlando, Fla.

[21] Appl. No.: 52,148

[22] Filed: Jun. 26, 1979

[51] Int. Cl.³ .............................................. B64C 13/14
[52] U.S. Cl. ....................................... 244/224; 70/18; 70/57; 70/DIG. 49; 340/545
[58] Field of Search ...................... 244/1 R, 83 A, 224; 70/18, 57, 58, 164, 167, 211, 238, 239, DIG. 34, DIG. 49; 340/63, 545, 546, 547, 570

[56] References Cited

U.S. PATENT DOCUMENTS

| | | | |
|---|---|---|---|
| 3,169,731 | 2/1965 | Phillips et al. | 244/83 A |
| 3,699,787 | 10/1972 | Corrado | 70/58 |
| 3,787,832 | 1/1974 | Bolinger | 340/545 |
| 3,803,576 | 4/1974 | Dobrzanski et al. | 340/545 |
| 4,052,867 | 10/1977 | Faunce | 70/58 |
| 4,134,279 | 1/1979 | Ross et al. | 70/18 |

*Primary Examiner*—Charles E. Frankfort
*Attorney, Agent, or Firm*—Berman, Aisenberg & Platt

[57] ABSTRACT

A device for locking the ailerons and elevators of an aircraft controlled by a wheel-operated longitudinally shiftable and rotatable control column, and, at the same time preventing theft of the navigational instruments and radio equipment mounted on the instrument panel in the cockpit of the plane. The protective device takes the form of a cover formed of two overlapping plates having an arrangement for adjusting the overall width. The adjusted cover is mounted immediately adjacent the instrument panel by means of upper and lower clamping blocks secured about the control column in such a manner as to prevent unauthorized movements of the column and access to the instruments on the panel. The blocks have complementary semi-cylindrical grooves which clamp about the control column, and one block is fixed to the cover plate while the other is hinged to the first for ready uncoupling and coupling movements. The pair of blocks are held in clamped arrangement by a key-operated cylinder lock seated in an aperture in one block having a latch member which releasably engages a cam surface in an aligned cavity in the second block to wedgingly clamp the blocks about the control column. One or more slotted brackets are provided to receive edge portions of the cover and prevent its being pried away from the instrument panel. The panel is also provided with an electric alarm circuit including a microswitch abutting the installed cover and operative to sound the alarm should an unauthorized person move the cover slightly away from the instrument panel.

16 Claims, 13 Drawing Figures

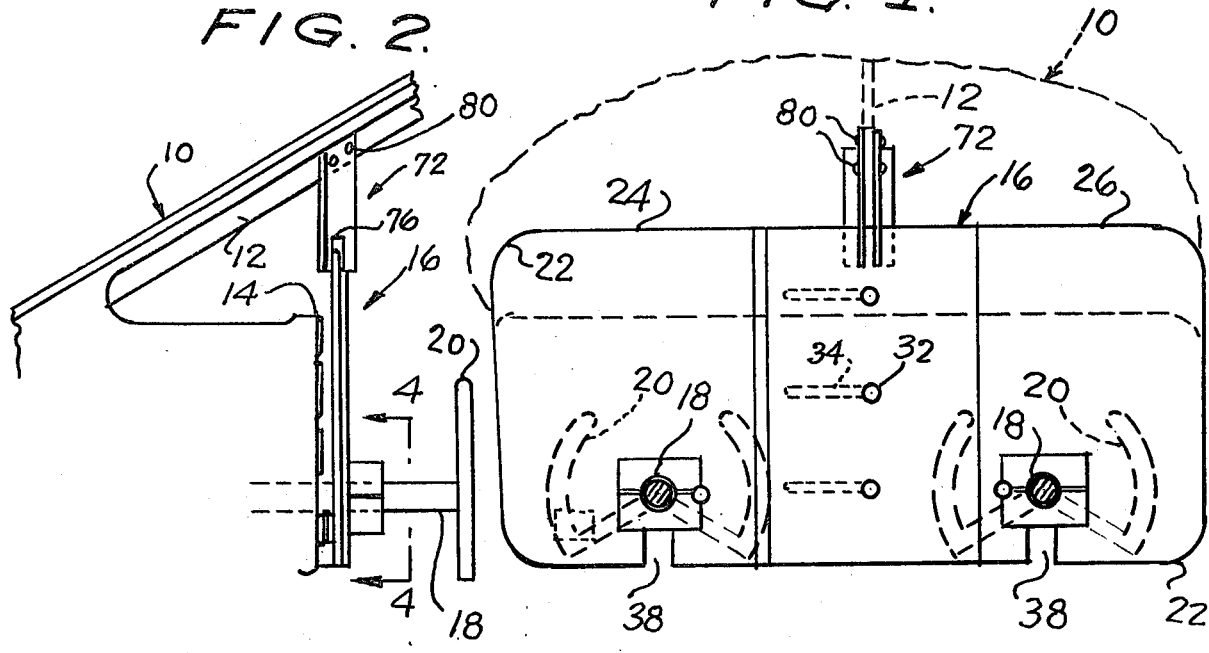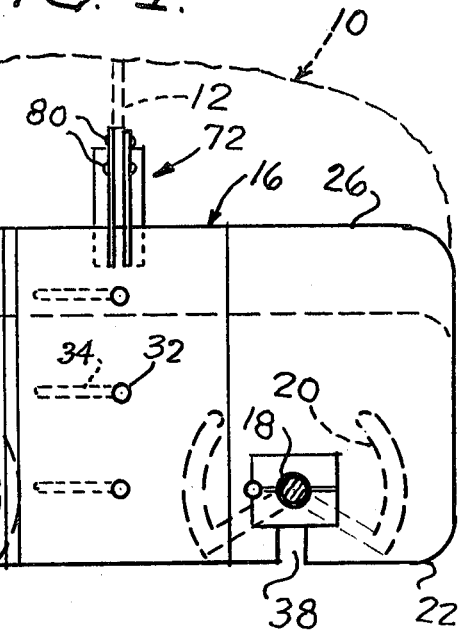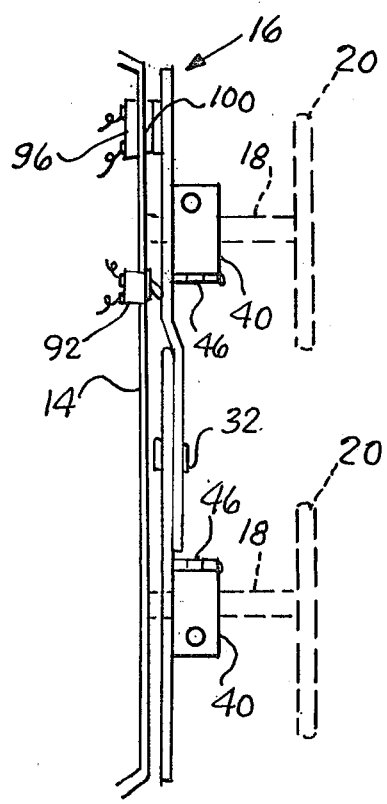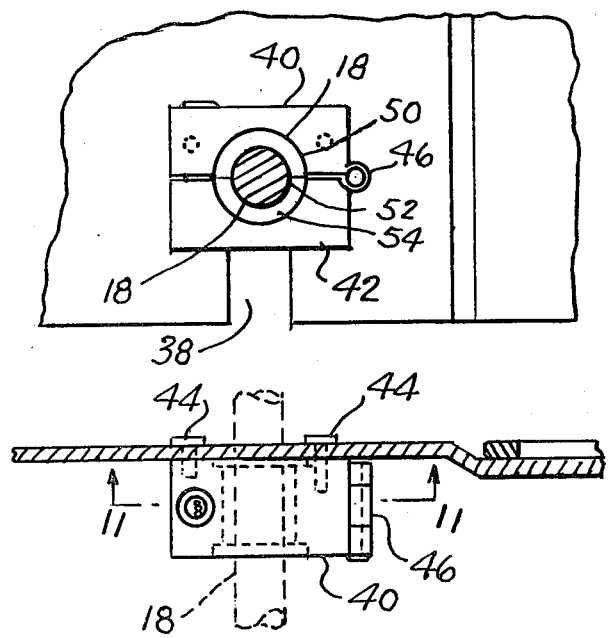

PROTECTIVE DEVICE FOR INSTRUMENTS AND LOCKING OF AIRCRAFT CONTROLS

This invention is an improvement on the invention disclosed in Application Ser. No. 012,463, filed by August Betts Yates on Feb. 15, 1979.

BACKGROUND OF THE INVENTION

1. Field of the Invention

This invention relates generally to aircraft devices, and more particularly, to an improved device for locking the ailerons and elevators of an aircraft so as to prevent unauthorized flight of a parked plane and also, for preventing theft of instruments or equipment from the instrument panel.

It is common knowledge that most light aircraft, for private use, are provided with cable operated controls including ailerons and elevators connected to a column, or shaft, turned by a wheel or yoke. The elevators during flight being positioned by pushing forward or pulling back the column in its longitudinal direction, and the ailerons being positioned by rotating the wheel.

Often such aircraft are not hangared, but merely tied down outside in a remote location on an airfield when not in use, so as to be subject to theft not only of the aircraft instruments, but also the aircraft itself. In general, the navigational instruments and radio equipment are constructed so that they can be readily installed or removed for repair or replacement from the front of the instrument panel. Accordingly, the removal and theft of the instruments and often the theft of the entire aircraft by flight from its parked position have become important concerns to the owners of such small aircraft.

2. Description of the Prior Art

A number of devices have been patented which are directed toward overcoming the problems briefly outlined above. Among these, U.S. Pat. No. 3,699,787 issued to Ronald F. Corrado, discloses a hollow cover which is mounted over a control column and directly in front of the instrument panel. The cover is locked in place by a tumbler lock which cooperates with a locking device fixed in the instrument panel. While this patent offers protection against theft of the instruments, it does not prevent a thief from manipulating the control shaft and connected wheel to fly the airplane away.

The Russel S. Ludeman U.S. Pat. No. 3,898,823, discloses a device for locking the controls of an aircraft which includes brackets secured to the pedals and wheel and connected by a tubular housing enclosing a piston-like spring device which resiliently locks the wheel and control column against movement when parked, so as to prevent unauthorized flights of the aircraft. It does not, however, offer any means to cover and prevent theft of the instruments from the instrument panel.

The Yates application mentioned above, offers a cover plate which mounts immediately adjacent the instrument panel and clamps about the aileron and elevator control column, thus providing a single device which both locks the aircraft controls and prevents theft of the aircraft instruments.

SUMMARY OF THE INVENTION

The present invention seeks to improve the Yates' device by: simplifying the structure of the cover; reducing the number of separate parts to be handled in mounting and dismounting; making the cover adjustable in size to fit various aircraft configurations: improving the frictional force of the clamping blocks on the aircraft control column; and providing electric alarm means which will warn of unauthorized tampering with the installed cover.

From the above it will be seen that it is a primary object of the invention to provide an improved single device which both locks the aircraft controls and prevents theft of the aircraft instruments, thus solving the problems outlined above and overcoming the defects and disadvantages of the prior art devices.

It is another important object of the invention to provide a protective device which is of simple construction, easy and inexpensive to fabricate, easy to install and is readily removable.

Yet, another important object of the invention is to provide a protective device, having the above described characteristics, which includes a cover plate adjustable in width for mounting directly adjacent and in front of instrument panels of varying configurations, said cover plate having mounting and locking means which cooperate with the control column of the aircraft and which clamp the control column against movements which would permit unauthorized takeoff and flight.

Still another important object of the invention is to provide a protective device, having the above described characteristics, which includes an electric alarm circuit operative to cause an audible or other alarm upon unauthorized tampering or slight movements of the installed cover away from the instrument panel.

The invention will be better understood and objects other than those set above will become apparent from reading the following detailed description thereof. Such description presenting preferred embodiments of the invention which are illustrated in the annexed drawings.

BRIEF DESCRIPTION OF THE DRAWINGS

FIG. 1 is an elevational front view of a protective cover device according to the invention installed in an aircraft cockpit;

FIG. 2 is a side elevation of the cover device of FIG. 1;

FIG. 3 is a top plan view of the installed cover of FIG. 1;

FIG. 4 is an enlarged fragmentary view showing a portion of the cover plate with one of the pairs of clamping blocks taken along line 4—4 of FIG. 2 and looking in the direction of the arrows;

FIG. 5 is a top plan view of the clamping blocks of FIG. 4, showing a portion of the cover plate in section;

DESCRIPTION OF THE PREFERRED EMBODIMENT

Figure 6:
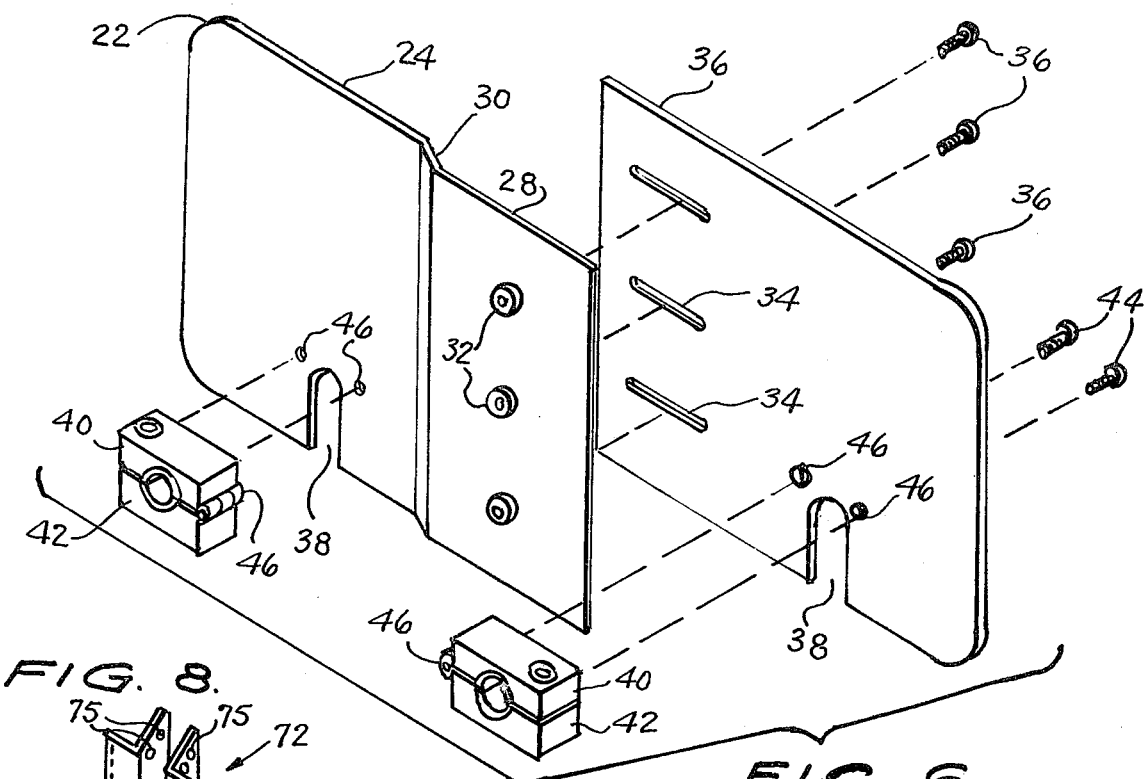
FIG. 6 is an exploded, perspective view of the cover device alone of FIG. 1.

Referring now to the drawings in greater detail, an outline portion of the front of the cockpit of a typical light aircraft is shown at 10 as having a rearwardly inclined center frame strut 12 in the windshield. The strut is directly above the center of the instrument panel 14, which is covered and protected by an upstanding protective plate generally indicated at 16.

The illustrated cockpit is one for a two-place light aircraft having the usual command pilot and co-pilot control shafts or columns 18,18 to be moved longitudinally forward and backward to operate the elevators (not shown) and rotated right or left by wheels, or yokes 20,20 to operate the ailerons, also not visible in the drawings.

The cover plate 16 is a generally rectangular, flat, strong, rigid plate having rounded upper and lower corners 22 and preferably formed of a lightweight metal, such as aluminum or aluminum alloy, or a reinforced plastic. The area of plate 16 is made sufficiently large to completely cover the instrument clusters on the instrument panel so as to prevent unauthorized removal of the instruments. In order to render the cover useable in cockpits of planes having different configurations, it is preferably formed of two parts 24,26 having overlapping center portions. The center portion 28 of part 24 is offset slightly at 30 (see FIG. 6) by a distance equal to the thickness of the plate and to lie in a parallel plane so that when parts 24 and 26 are juxtaposed they are aligned in the same plane. A plurality of vertically spaced holes are formed in overlapping portion 28 and a nut 32, preferably with a rounded, beveled rim to prevent removal, is welded on the near face of portion 28 in alignment with each hole. A plurality of elongated, horzon slots 34, having the same spacing from one another as the holes and coaxial nuts 32, are formed in part 26. It will be readily understood that the screws 36, when passed through slots 34 aligned holes in part 28, and threadedly engaged in nuts 32, enable adjustment of the amount of overlap of part 28 and thus the parts 24,26 can be preliminarily set to a desired width for a given cockpit or instrument panel and the screws then tightened to fix and maintain said width as long as the cover is used in the same plane.

A pair of slots 38,38 are formed or cut out from the bottom edges of the cover plate parts 24,26. The slots are slightly larger than the diameter of control columns 18, 18 so that the plate may be lowered over the columns which ride upwardly in the slots to their upper ends, a short distance above the bottom edge of the plate 16.

For clamping each control column, there is provided a pair of complementary blocks 40,42 (see FIGS. 4-6) formed of metal, or other suitable material. The upper blocks 40 are affixed to plate parts 24,26 by pairs of screws 44,44 which pass through openings 46,46 in the cover parts and aligned, threaded openings in the blocks. Each of the blocks 40 has a downwardly opening, semicylindrical recess 48 and rubber liner 50 for tightly receiving the shaft, or control column 18, at the top of slot 38. A similar and mating recess 52 and liner are provided in the lower clamping block 42. Each lower block 42 is connected at its upper inside edge to the adjacent edge of its upper block by a hinge 46, so that the lower blocks are free to swing down and away by gravity to free the control columns from clamped condition.

Figures 10, 11, 12:
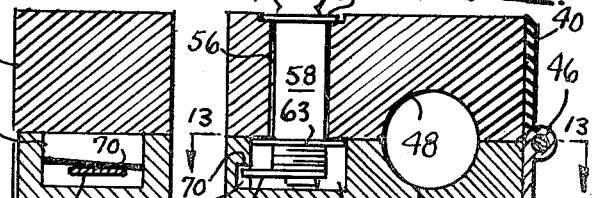
FIG. 10 is a schematic circuit diagram of the electric alarm circuit used in FIG. 1.
FIG. 11 is a central vertical sectional view of the clamping blocks taken along line 11—11 of FIG. 5 and looking in the direction of the arrows.
FIG. 12 is a section view taken along line 12—12 of FIG. 11 and looking in the direction of the arrows.
Figure 13:
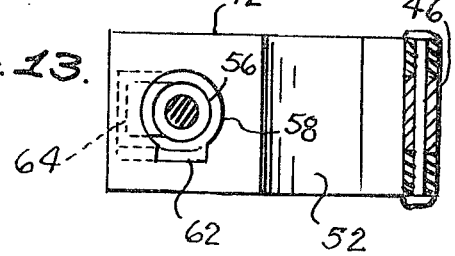
FIG. 13 is a sectional view taken along line 13—13 of FIG. 11 and looking in the direction of the arrows.

To complete the securement and clamping action of the blocks, as best seen in FIGS. 11-13, each block 40 is provided at the side opposite the hinge with a vertical through hole 56 in which is placed a cylindrical tumbler lock 58 operated by a removable key 60. The lock is held between an upper flange 61 and a threaded ring 63 engaging the bottom of the block. A rotatable latch member 64 is fastened to the lock shaft below the bottom of block 40. Each lower block 42 has a cavity 66 aligned with hole 56 in the upper block and larger than the same. A further enlargement 68 is provided on one side of cavity 66, and cavity part 68 is provided with an inclined upper face 70. When key 60 is turned to lock the blocks together, latch member 64 turns out of cavity 66 into enlargement 68, and riding against the inclined surface 70 wedges the upper and lower blocks into tighter clamping engagement about the control columns, compressing the rubber liners in the semicylindrical recesses 48 52.

Figure 8:
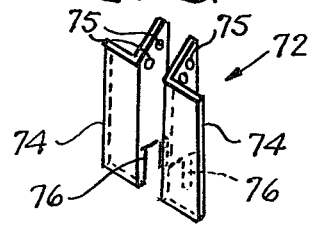
FIG. 8 is a perspective view of plate retaining bracket means of FIG. 1.

In FIGS. 1, 2 and 8 are illustrated bracket means 72 for retaining the central upper edge of cover plate 16 in mounted condition and to deter unauthorized attempts to pry the cover away from the instrument panel. The bracket means 72 comprises a pair of L-shaped angle irons 74,74 each having a pair of mounting holes 75 in the upper part of one leg and a downwardly opening slot 76 in the lower edge of the same leg. The angle irons 74,74 are rigidly fastened to the central frame rib 12 of the cockpit windshield by a pair of bolts 80 passing through holes 75 and aligned openings in the rib 12 as best seen in FIG. 2.

To install the protective panel of the embodiment thus far described when the aircraft has been parked and tied down on the airfield, the control yokes are positioned in the full climb direction (pulled completely toward the pilot) to prevent taxiing and flight by unauthorized persons. The cover plate 16, already adjusted to its proper width for the aircraft concerned, and with the pairs of clamping blocks unlocked and lower blocks 42,42 hanging turned on their hinges, is then lowered to seat the control columns 18, 18 in recesses 48,48 of the upper clamping blocks with the top of plate 16, tilted toward the windshield. The plate 16 is then slid into slots 76 of bracket means 72 and the columns 18,18 are pushed toward the front of the aircraft causing the cover bottom to slide against the instrument panel 14 and the cover to take the protective vertical position illustrated in FIG. 2. The columns 18,18 are then pulled rearwardly to full climb position while holding the cover against the instrument panel. The lower clamping blocks in turn are then swung upwardly to engage the bottoms of the columns in the recesses 52,52 of the blocks, and the locks 58 are operated by key 60 to turn the latch members 64 against cam surfaces 70 and wedge the lower blocks into tight clamping engagement with the control columns. This draws the blocks more tightly together to rigidly clamp the control columns against longitudinal and rotary movement. Since the plate 16 is held flush against the instrument panel by the locking action of the clamping blocks and bracket means 72, thieves are prevented from easy access to the instruments. It should further be pointed out that many small aircraft are provided with a pin under or near the instrument panel that drops through the control column to prevent control surface movements due to wind. The plate 16, when locked in place, prevents said pin from being removed from the control column.

When an authorized person desires to fly the aircraft, he merely uses key 60 to unlock the locks 58,58. The lower clamping blocks turn by gravity away from the upper blocks releasing the columns 18,18. The pilot then removes plate 16 from the instrument panel and control columns by reversing the installation procedure described above.

Figure 9:
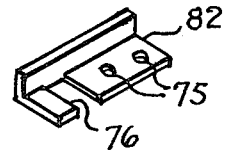
FIG. 9 is a perspective view of plate retaining bracket means of FIG. 7.
Figure 7:
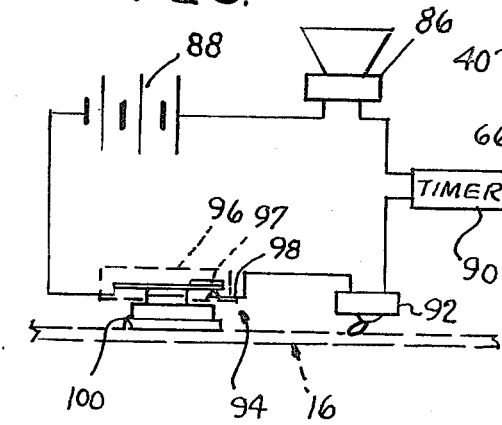
FIG. 7 is a top plan view similar to FIG. 3, but showing a modified embodiment of the cover device.

For certain configurations of small aircraft, it may be desireable or necessary to substitute for the central bracket means 72 a pair of side brackets 82,84 illustrated in FIGS. 6 and 9. The latter brackets are also L-angle bars having mounting holes 75 and slots 76 to receive the cover, but they are fastened to side members of the aircraft frame, or to a horizontal top surface of the instrument panel 14 as illustrated in FIG. 6. With the side brackets 82,84, the cover 16 may be lowered vertically onto the control columns when being installed avoiding the tilting of the cover and pushing and pulling of the columns as described above for the previous embodiment utilizing central bracket means. There may be instances of aircraft configurations where a slight amount of tilting of the cover is required even with side brackets 82,84.

It should be recognized that, give the right tools and sufficient time, a thief can finally pick the locks 58 and/or pry or bend the cover away from the instrument panel. To avoid theft of the instruments or aircraft in such instances, an optional safety alarm circuit as shown in FIG. 10 is provided. The circuit includes an audible, or other alarm device which produces a loud pulsing sound, such as a Piezo Transducer 86 in series with the aircraft battery 88, or other power source. The alarm 86 may, for example, be device #X51W12A, marketed by Products Unlimited. The series circuit further includes a conventional timer 90 which retains the circuit open but may be preset to close the circuit after a desired, preset time interval, an arming switch 92 manually operated, such as a toggle switch, and an alarm switch 94 having a portion 96 including contacts 97,98, mounted on the instrument panel and a portion 100 mounted on the cover. Switch 94 may, for example, be either a microswitch or a magnetic switch, and when the cover is properly installed adjacent the instrument panel, the contacts 97,98 are held open by juxtaposition of portions 96 and 100, the latter being an actuator or latching magnet depending upon the type of switch used. However, when the cover 16 is moved even slightly away from the instrument panel, the contacts 97,98 are closed, actuating alarm 86. The arming switch 92 may be mounted on the instrument panel behind the cover 16 where it cannot be opened until the cover is removed, or it may be mounted anywhere else in an inconspicuous place, so that a thief would be unable to shut off the alarm before attempting to remove the cover.

In using the alarm as illustrated, before installing the cover, the timer 90 is set for a period sufficient to mount the cover, say 90 seconds. This retains the series circuit of the alarm open even though the arming switch 92 is immediately closed. The protective cover 16 is then installed, the preset period of 90 seconds yielding sufficient time to complete the installation before the timer closes the alarm circuit. Upon completion of the installation, the cover and alarm switch portion 100 opens contacts 97,98 and retains the alarm circuit open as long as the cover is not moved. Any unauthorized movement of the cover and switch portion 100 away from switch portion 96 closes the alarm circuit through the closed timer and arming switch causing device 86 to put out a loud pulsing sound. When an authorized person proceeds to remove the cover, he first opens arming switch 92, preventing sounding of an alarm. If the arming switch 92 is placed away from cover 16 in an accessible location, the timer may be set for a shorter period, as for example, 30 seconds, and the alarming switch closed after the cover is installed.

It should be obvious that the described embodiments of the invention may be readily tailored in size and shape to fit various conventional light aircraft having somewhat different configurations. Changes in details are also possible and obvious. For example, where only a single control column 16 is present only one pair of clamping blocks 40,42 is required. It should also be noted that most fastener and operating elements, such as bolts 36,44 are inserted from behind the cover where they are inaccessible once the cover is installed. Those which are accessible, such as nuts 32 and bracket bolts 80, are made as tamper-proof as possible by rounding and tapering the heads and nuts.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In an aircraft having an instrument panel and controls for aileron and elevator flight control surfaces, said controls including at least one column turned by a hand operated yoke and movable axially for controlling the ailerons and elevators, respectively, a protective device for preventing theft of the aircraft instruments from said panel and preventing unauthorized flight removal of the aircraft from a parking area, said device comprising a protective instrument cover in the form of a rigid, substantially planar plate, and means for lockingly mounting said cover in a position immediately adjacent the aircraft instrument panel and to said at least one column in such manner as to prevent unauthorized movements of said column and the ailerons and elevators controlled thereby, said means for lockingly mounting the cover including first and second complementary blocks having complementary semi-cylindrical surfaces which frictionally clamp about the column to prevent its movements, said first block being fixed to said plate and hinge means connecting the second block along one edge to the first block, and means for locking the blocks together comprising an opening through one block aligned with a cavity in the other, said cavity including an inclined cam surface, and a key operated cylindrical lock inserted through said opening into said cavity and having a latch member rotated by the key and bearing against said cam surface to force the two blocks more tightly together.

2. A protective device, as set forth in claim 1, wherein said cover plate has a slot extending upwardly from its bottom edge and aligned with the semicylindrical surface of the first block to permit mounting and removal of the plate over said column when said key operated cylindrical lock is unlocked and said second block has been turned away from the first block about said hinge means.

3. A protective device, as set forth in claim 2, wherein said cover plate is formed in two parts having overlapping areas, and means is provided for adjustably connecting said two parts together to vary the adjusted size of said plate, and wherein there is further provided two pairs of said first and second blocks for clamping two control columns, one block of one pair being fixed to one part of said cover plate and one block of the second pair being fixed to the other part of the cover plate.

4. A protective device, as set forth in claim 1, wherein said complementary semi-cylindrical surfaces are lined with a compressible, resilient friction material for clamping about said column.

5. The protective device set forth in claim 1 further including alarm means including an electric alarm circuit having an alarm switch effective to actuate the alarm upon movement of the cover plate away from the instrument panel.

6. A protective device, as set forth in claim 5, wherein said alarm circuit includes an audible alarm means and a source of power in series with said alarm switch, said switch abutting said cover and being actuated to off condition when the cover is properly mounted adjacent the instrument panel.

7. A protective device, as set forth in claim 6, wherein said alarm switch is a microswitch.

8. A protective device, as set forth in claim 6, wherein said alarm switch is a magnetic switch.

9. A protective device, as set forth in claim 6, wherein said alarm circuit further includes a timer and an arming switch in series with the alarm, said timer being settable to close the circuit after a predetermined time period sufficient to mount the cover adjacent the instrument panel, and the arming switch being a manually operable on/off switch.

10. The protective device set forth in claim 1 wherein said planar plate includes two parts having overlapping areas and means for adjustably connecting said two parts together so as to vary the adjusted size of said plate.

11. A protective device, as set forth in claim 10, wherein said means for adjustably connecting the said two parts of the plate comprises at least one elongated slot formed in the overlapping area of one part, an aperture in the overlapping area of the other part aligned with said slot, and threaded lock means passing through the slot and aperture and cooperating with thread means in one of said slot and aperture to fasten the two parts together.

12. A protective device, as set forth in claim 11, wherein said means for adjustably connecting the said two parts of the plate comprises a plurality of horizontal elongated slots formed in one part, a plurality of apertures aligned with said slots formed in the other part, and a plurality of bolts passing through the respective aligned slots and apertures and cooperating with thread means associated with said apertures.

13. A protective device, as set forth in claim 12, wherein said overlapping area of one of said parts is offset from the plane of the rest of the part by a distance approximating the thickness of said part, the offset overlapping area lying in a plane parallel to said rest of the part.

14. The protective device set forth in claim 1 further including means for clamping an edge portion of said cover plate.

15. A protective device, as set forth in claim 14, wherein said further means comprises a bracket means having a downwardly opening slot and secured to a central frame post of the aircraft, the upper central edge portion of said cover plate being inserted in said slot when the plate is mounted adjacent the instrument panel.

16. A protective device, as set forth in claim 14, wherein said further means comprises a pair of laterally spaced brackets each having an inwardly opening slot and secured to frame portions of the aircraft and the sides of said cover plate, portions of the side edges of the cover plate being inserted in the slots of said brackets when the plate is mounted adjacent the instrument panel.

* * * * *